United States Patent
Jeong et al.

(10) Patent No.: US 9,639,971 B2
(45) Date of Patent: May 2, 2017

(54) IMAGE PROCESSING APPARATUS AND METHOD FOR PROCESSING TRANSPARENCY INFORMATION OF DRAWING COMMANDS

(71) Applicant: SAMSUNG ELECTRONICS CO., LTD., Suwon-si (KR)

(72) Inventors: Min-kyu Jeong, Yongin-si (KR); Kwon-taek Kwon, Seoul (KR); Min-young Son, Hwaseong-si (KR); Jeong-soo Park, Gwacheon-si (KR); Sang-oak Woo, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 165 days.

(21) Appl. No.: 14/508,454

(22) Filed: Oct. 7, 2014

(65) Prior Publication Data

US 2015/0097830 A1     Apr. 9, 2015

(30) Foreign Application Priority Data

Oct. 8, 2013    (KR) ........................ 10-2013-0120192

(51) Int. Cl.
    *G06T 15/00*        (2011.01)
    *G06T 15/80*        (2011.01)
    *G06T 15/40*        (2011.01)

(52) U.S. Cl.
    CPC ............ *G06T 15/005* (2013.01); *G06T 15/40* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 5,596,686 A | * | 1/1997 | Duluk, Jr. ............. G06T 15/405 |
| | | | 345/422 |
| 6,320,580 B1 | | 11/2001 | Yasui et al. |
| 7,456,846 B1 | | 11/2008 | King et al. |
| 9,176,880 B2 | | 11/2015 | Lee et al. |
| 9,323,717 B2 | | 4/2016 | Kwon et al. |
| 9,342,282 B2 | | 5/2016 | Son et al. |

(Continued)

FOREIGN PATENT DOCUMENTS

| | | |
|---|---|---|
| EP | 0 850 462 A2 | 7/1998 |
| JP | 06-274646 | 9/1994 |

(Continued)

OTHER PUBLICATIONS

S. Deb, et al., "Visibility Cuts: A System for Rendering Dynamic Virtual Environments," Sixth Indian Conference on Computer Vision, Graphics & Image Processing (ICVGIP '08), Dec. 2008, pp. 47-54.

(Continued)

*Primary Examiner* — Ryan D McCulley
(74) *Attorney, Agent, or Firm* — Harness, Dickey & Pierce, P.L.C.

(57) ABSTRACT

An image processing method includes: determining whether a draw command that is identical to a previous draw command is input; obtaining information about a transparency of a previous frame that is performed with the previous draw command; and performing image processing on a current frame based on the information about the transparency.

19 Claims, 7 Drawing Sheets

(56) References Cited

U.S. PATENT DOCUMENTS

| | | | |
|---|---|---|---|
| 9,405,546 B2 | 8/2016 | Kwon et al. | |
| 2003/0090486 A1* | 5/2003 | Ashburn | G06T 15/005 345/422 |
| 2005/0017970 A1 | 1/2005 | Howson | |
| 2006/0248571 A1* | 11/2006 | Ruge | G06F 3/14 725/135 |
| 2007/0211048 A1 | 9/2007 | Howson | |
| 2008/0225048 A1 | 9/2008 | Bijankumar et al. | |
| 2010/0007662 A1 | 1/2010 | Cox et al. | |
| 2010/0309203 A1* | 12/2010 | Masuda | G06T 15/40 345/419 |
| 2011/0199377 A1* | 8/2011 | Jang | G06T 15/20 345/426 |
| 2011/0199605 A1 | 8/2011 | Yaacobi | |
| 2011/0291746 A1 | 12/2011 | Ibrahim et al. | |
| 2012/0137076 A1 | 5/2012 | Heggelund et al. | |
| 2012/0188261 A1 | 7/2012 | Riach et al. | |
| 2012/0206455 A1 | 8/2012 | Shreiner | |
| 2013/0063440 A1 | 3/2013 | Son et al. | |
| 2013/0076762 A1 | 3/2013 | Heggelund et al. | |

FOREIGN PATENT DOCUMENTS

| | | |
|---|---|---|
| KR | 10-2005-0093863 | 9/2005 |
| KR | 10-0693134 | 3/2007 |
| KR | 10-1018999 | 3/2011 |
| KR | 10-2013-0030515 A | 3/2013 |
| KR | 10-2013-0041585 A | 4/2013 |
| KR | 10-2014-0023561 A | 2/2014 |
| KR | 10-2014-0111416 A | 9/2014 |
| WO | WO 97/06512 A2 | 2/1997 |
| WO | WO 97/06512 A3 | 2/1997 |

OTHER PUBLICATIONS

F. Khalvati, et al., "An Efficient Architecture for Hardware Implementations of Image Processing Algorithms", IEEE Symposium on Computational Intelligence for Image Processing (CIIP '09), Mar. 2009 (7 pages, in English).

J. Ragan-Kelley, et al., "Decoupled Sampling for Graphics Pipelines," Journal of ACM Transactions on Graphics (TOG), vol. 30, Issue 3, May 2011, pp. 1-17.

M. Maule, et al., "A survey of raster-based transparency techniques," Computer & Graphics, Vo. 35, Issue 6, Dec. 2011, pp. 1023-1034.

G. Liktor, et al., "Decoupled Deferred Shading for Hardware Rasterization," Proceedings of the ACM SIGGRAPH Symposium on Interactive 3D Graphics and Games (I3D '12), Mar. 2012, pp. 143-150.

D. Scherzer, et al., "Temporal Coherence Methods in Real-Time Rendering," Journal of Computer Graphics Forum, vol. 31, Issue 8, Dec. 2012 (29 pages, in English).

Extended European Search Report issued on Aug. 7, 2015, in counterpart European Application No. 14187944.5 (18 pages, in English).

Scherzer et al., "Temporal Coherence Methods in Real-Time Rendering", Computer Graphics Forum, 2012 The Eurographics Association and Blackwell Publishing Ltd., pp. 2379-2408.

D. Scherzer, et al., "A Survey on Temporal Coherence Methods in Real-Time Rendering," *EUROGRAPHICS 2011*, STAR—State of the Art Report, 2011 (26 pages, in English).

M. Ribble, "Power Friendly GPU Programming," *Proceedings of the 39th International Conference and Exhibition on Computer Graphics and Interactive Techniques*, ACM SIGGRAPH 2012 (19 pages, in English).

\* cited by examiner

IMAGE PROCESSING APPARATUS AND METHOD FOR PROCESSING TRANSPARENCY INFORMATION OF DRAWING COMMANDS

CROSS-REFERENCE TO RELATED APPLICATIONS

This application claims the benefit of Korean Patent Application No. 10-2013-0120192, filed on Oct. 8, 2013, in the Korean Intellectual Property Office, the disclosure of which is incorporated herein in its entirety by reference.

BACKGROUND

1. Field

One or more embodiments of the present disclosure relate to image processing apparatuses and methods.

2. Description of the Related Art

Examples of three-dimensional (3D) application program interface (API) standards include OpenGL, OpenGL ES, and Direct 3. API standards include a method of performing rendering on each frame and displaying an image. When rendering must be performed on each frame, the computation amount and power consumption are commensurately increased. Accordingly, it may be desirable to reduce the computational amount and number of accesses to a memory when rendering is performed.

SUMMARY

One or more embodiments of the present disclosure include image processing apparatuses and methods that may reduce the computational amount when rendering is performed on a frame including a transparent object or primitive.

Computer-readable recording media having embodied thereon programs for executing the methods are further provided. Additional aspects will be set forth in part in the description which follows and, in part, will be apparent from the description, or may be learned by practice of the presented embodiments.

According to an aspect of the present disclosure, an image processing method includes: determining whether a draw command that is identical to a previous draw command is input; obtaining information about a transparency of a previous frame that is performed with the previous draw command; and performing image processing on a current frame based on the information about the transparency.

According to another aspect of the present disclosure, an image processing method includes: determining whether a previous draw command and a current draw command are identical to each other; when the previous draw command and the current draw command are identical to each other, obtaining depth information and transparency information obtained during rendering with the previous draw command; and removing a hidden surface for a current frame based on the depth information and the transparency information.

According to another aspect of the present disclosure, an image processing apparatus includes: a determining unit that determines whether a draw command that is identical to a previous draw command is input; an obtaining unit that obtains information about a transparency of a previous frame performed with the previous draw command; and an image processing unit that performs image processing on a current frame based on the information about the transparency.

According to an aspect of the present disclosure, an image processing apparatus includes a processor, a determining unit to determine whether a draw command of a previous frame is similar to a draw command of an input frame, an obtaining unit to obtain information about a transparency of the previous frame, and an image processing unit to perform image processing on the input frame based on the information about the transparency of the previous frame when the draw command of the previous frame is determined to be similar to the draw command of the input frame.

According to an aspect of the present disclosure, an image processing method includes determining a degree of transparency of an object in a current frame based on a transparency of an inter-frame coherent object in a previous frame and performing image processing, by way of a hardware-based processor, on an input frame based on the determining of the degree of transparency of the object in the current frame.

According to an aspect of the present disclosure, an image processing method includes determining, by way of a hardware-based processor, whether a draw command of a previous frame is similar to a draw command of an input frame, obtaining information about a transparency of an object or primitive in the previous frame that is performed with the previous draw command, designating a transparency of a primitive or object included in the current frame based on the information about the transparency of the object or primitive of the previous frame when the draw command of the previous frame is determined to be similar to the draw command of the input frame, and performing shading on an opaque fragment of the object or primitive of the current frame and then performing shading on a transparent fragment of the object or primitive of the current frame when the transparent fragment is located in front of the opaque fragment.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings. As used herein, the term "and/or" includes any and all combinations of one or more of the associated listed items. Expressions such as "at least one of," when preceding a list of elements, modify the entire list of elements and do not modify the individual elements of the list.

Figure 1:
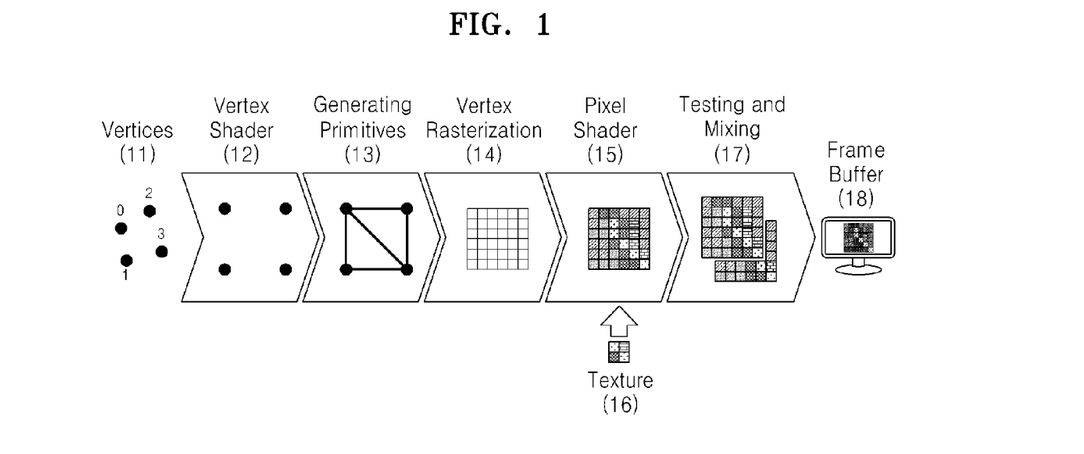
FIG. 1 is a diagram for explaining a process of processing a three-dimensional (3D) image.

FIG. 1 illustrates a method of processing a three-dimensional (3D) image including operations 11 through 17.

Operation 11 is an operation of generating vertices indicating an image. The vertices are generated in order to describe objects included in the image.

Operation 12 is an operation of shading the generated vertices. A vertex shader may perform shading on the vertices by assigning colors to the vertices generated in the operation 11.

Operation 13 is an operation of generating primitives. The term 'primitive' may refer to a polygon that is formed of points, lines, or vertices. For example, the primitives may be triangles formed by connecting three vertices.

Operation 14 is an operation of rasterizing a primitive. When the primitive is rasterized, the primitive is divided into a plurality of fragments. The term 'fragment' refers to a portion of a primitive and may be a basic unit for performing image processing. A primitive includes only information about vertices. Accordingly, interpolation is performed when fragments between vertices are generated during rasterization.

Operation 15 is an operation of shading pixels. Although shading is performed in units of pixels in FIG. 1, shading may be also performed in units of fragments. For example, when pixels or fragments are shaded, colors of the pixels or the fragments are assigned to pixels or fragments, respectively.

Operation 16 is an operation of texturing the pixels or the fragments. Texturing is a method of using an image that has been previously generated when a color of a pixel or a fragment is designated. For example, when a color is designated to a fragment, shading is performed through computation whereas texturing is a method of assigning the same color as a color of an image that has been previously generated to a fragment corresponding to the image.

In operation 15 or 16, a large computational amount is required in order to shade or texture each pixel or fragment. Accordingly, it is desirable to reduce the computational amount by more efficiently performing shading or texturing. A representative method of reducing the computational amount during shading is hidden surface removal (HSR). In an HSR method, shading is not performed on a first object obscured by a second object, such as when the second object is located in front of the first object. The HSR method will be explained below in detail with reference to FIG. 2.

Operation 17 is an operation of performing testing and mixing.

Operation 18 is an operation of displaying a frame that is stored in a frame buffer. A frame generated through the operations 11 through 17 is stored in the frame buffer. The frame that is stored in the frame buffer is displayed on a display device.

Figure 2:
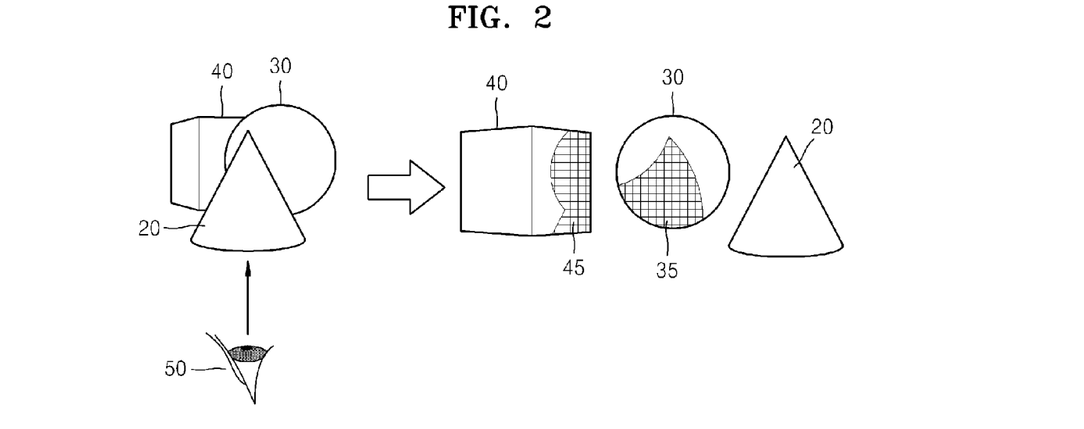
FIG. 2 is a view for explaining a method of removing a hidden surface.

FIG. 2 is a view for explaining an HSR method. The HSR method is a representative method that reduces the amount of computation used during shading. The HSR method does not perform shading on a portion of a first object obscured by a second object that is located in front of the first object. For example, when a plurality of objects exist in a 3D space, the plurality of objects may overlap with one another. A plurality of objects, for example, first through third objects 20, 30, and 40, exist in a 3D space in FIG. 2. When the first through third objects 20, 30, and 40 are seen from a focal point 50, the first through third objects 20, 30, and 40 overlap with one another. Accordingly, a portion 35 of the second object 30 is covered or obscured by the first object 20. Also, a portion 45 of the third object 40 is covered by the first and second objects 20 and 30. Accordingly, since the portions 35 and 45 covered by the objects that are located in front of the second and third objects 30 and 40 are not displayed on a frame, colors do not need to be assigned to the portions 35 and 45 and shading need not be performed on portions 35 and 45.

When a conventional standard is used to shade objects 20, 30, and 40 of FIG. 2, the conventional standard is not able to predict whether an object is transparent, translucent or opaque. For this reason, the conventional standard must make a first pass of the shading process with the assumption that each of objects 20, 30, and 40 are opaque. Since the conventional standard first assumes that all of items 20, 30, and 40 are opaque, HSR is used to avoid shading hidden areas 35 and 45. If the conventional standard then determines after the first pass of the shading process that items 20 and 30 are transparent, an additional pass must occur to shade areas 35 and 45, since the areas are not in fact hidden areas as originally assumed, because items 20 and 30 are transparent and not opaque. Additional computational disadvantages arise from the conventional standard due to the fact that a shading result of an intermediate translucent fragment has to be stored or re-computation has to be performed.

Figure 3:
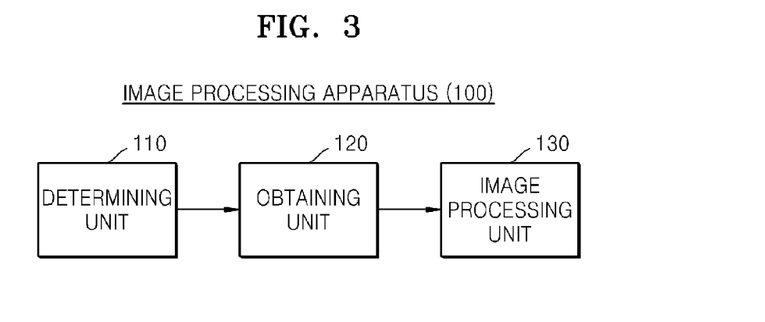
FIG. 3 is a block diagram for explaining an image processing apparatus according to an embodiment of the present disclosure.

FIG. 3 illustrates an image processing apparatus 100 according to an embodiment of the present disclosure. Referring to FIG. 3, the image processing apparatus 100 may include, for example, a determining unit 110, an obtaining unit 120, and an image processing unit 130. The image processing apparatus 100 performs shading on fragments. In this case, the image processing apparatus 100 may perform shading on a current frame by using transparency information of a previous frame. For example, the image processing apparatus 100 may reduce the computational amount needed for image processing by applying transparency information of an object or a primitive obtained from the previous frame to an object or a primitive of the current frame.

Since the image processing apparatus 100 processes an image for the current frame by using the fact that an attribute of an inter-frame coherent object has not changed, image processing may be efficiently performed on the same object.

The image processing apparatus 100 may remove a hidden surface by using depth information and transparency information obtained during rendering with a previous draw command. The term "depth information" refers to information about fragments which have varying degrees of depth. For example, when a variable representing a depth is Z, Z=1 may indicate a depth of a first fragment and Z=2 may indicate a depth of a second fragment. The term "transparency information" refers to information indicating whether an object or a primitive is transparent, translucent, or opaque. The transparency information may be stored in units of objects, primitives, or fragments. The image processing apparatus 100 performs rendering with a previous draw command, and determines whether an object, a primitive, or a fragment is transparent, translucent, or opaque during the rendering. The image processing apparatus 100 stores the determined transparency information, and removes a hidden surface by using the transparency information when a next draw command is executed. For example, when a first object is opaque, the image processing apparatus 100 performs shading only on the opaque object and not on a second object that is located behind the first object and obscured by the first object. However, when a first object is transparent, the image processing apparatus 100 performs shading on the first object and on the second object that is located behind the first object and obscured by the first object. In this case, the first object is determined as transparent, translucent, or opaque by using transparency information obtained during a previous rendering.

The image processing apparatus 100 may include at least one processor. Also, each of the determining unit 110, the obtaining unit 120, and the image processing unit 130 included in the image processing apparatus 100 may be formed to include a processor. For example, each of the determining unit 110, the obtaining unit 120, and the image processing unit 130 may be a logic circuit or a program included in a processor. Alternatively, each of the determining unit 110, the obtaining unit 120, and the image processing unit 130 may be an individual processor.

The determining unit 110 determines whether a draw command that is identical to the previous draw command is input. The determining unit 110 may determine whether an inter-frame coherent object or primitive is included by determining whether the previous draw command and the input draw command are identical to each other.

A draw command includes information about an object or a primitive. In other words, a draw command includes information about whether rendering is to be performed on a certain object or primitive.

For example, the determining unit 110 may determine whether the previous draw command and the input draw command are identical to each other by comparing all, essential parts, or summary information of the previous draw command with all, essential parts, or summary information of the input draw command. For example, the determining unit 110 may determine that the previous draw command and the input draw command are identical to each other when all parts, essential parts, or summary information of the input draw command are identical to each other.

The determining unit 110 may determine whether the previous draw command and the input draw command include at least one same object. Alternatively, the determining unit 110 may determine whether the previous draw command and the input draw command include at least one primitive that is the same.

When some parts of the previous draw command and the input draw command that is a current draw command are identical to each other, the determining unit 110 may determine that only some parts of the previous draw command and the current draw command are identical to each other.

For example, the determining unit 110 may determine that an object included in the previous draw command and an object included in the current draw command are identical to each other. As another example, the determining unit 110 may determine that a primitive included in the previous draw command and a primitive included in the current draw command are identical to each other.

The obtaining unit 120 obtains information about a transparency of the previous frame. The previous frame is an image performed with the previous draw command. The obtaining unit 120 obtains a transparency of a primitive or an object included in the previous frame.

When a transparency ratio of pixels constituting the primitive or the object is higher than a preset ratio, the obtaining unit 120 may designate the primitive or the object as transparent. Also, when a transparency ratio of fragments constituting the primitive or the object is higher than a preset ratio, the obtaining unit 120 may designate the primitive or the object as transparent. For example, when 90% or more of fragments from among fragments of the primitive are transparent, the obtaining unit 120 may designate the primitive as transparent.

When the previous draw command and the current draw command are identical to each other, the obtaining unit 120 may obtain depth information and transparency information obtained during rendering with the previous draw command. In other words, the obtaining unit 120 obtains information indicating a transparency of a fragment according to a depth during rendering with the previous draw command.

The image processing unit 130 performs image processing on the current frame based on the information about the transparency. That is, the image processing unit 130 designates a primitive or object included in the current frame as transparent when a corresponding primitive or object included in a previous frame is designated as transparent, and performs image processing. In an embodiment, a corresponding primitive or object is a primitive or object in the current frame that is similar or identical to a primitive or object included in the previous frame or vice-versa.

Accordingly, since the image processing apparatus 100 designates an object as transparent in advance, the image processing apparatus 100 omits a process of performing shading in a depth direction on a transparent object and instead performs shading in a reverse direction.

That is, by applying the depth information and the transparency information from a previous frame to a fragment of the current frame, when a transparent fragment is located in front of an opaque fragment, the image processing unit 130 performs shading in a reverse direction. In other words, the image processing unit 130 first performs shading on the opaque fragment and then performs shading on the transparent fragment. Since the image processing unit 130 first performs shading on the opaque fragment, unnecessary computation may be reduced. If the image processing unit 130 first performs shading on the transparent fragment, unnecessary computation of performing shading on the opaque fragment and performing shading on another transparent fragment is performed. Accordingly, when a transparent fragment is located in front of an opaque fragment according to the information about transparency information, the image processing unit 130 first performs shading on the opaque fragment.

The image processing unit 130 removes a hidden surface for the current frame based on the depth information and the transparency information of the previous frame. When a transparent fragment is located in front of an opaque fragment, the image processing unit 130 may remove a hidden surface that is located behind the opaque fragment by first performing shading on the opaque fragment. The image processing unit 130 removes a hidden surface by not performing shading on fragments at deeper positions than the opaque fragment that are obscured by the opaque fragment.

Figure 4:
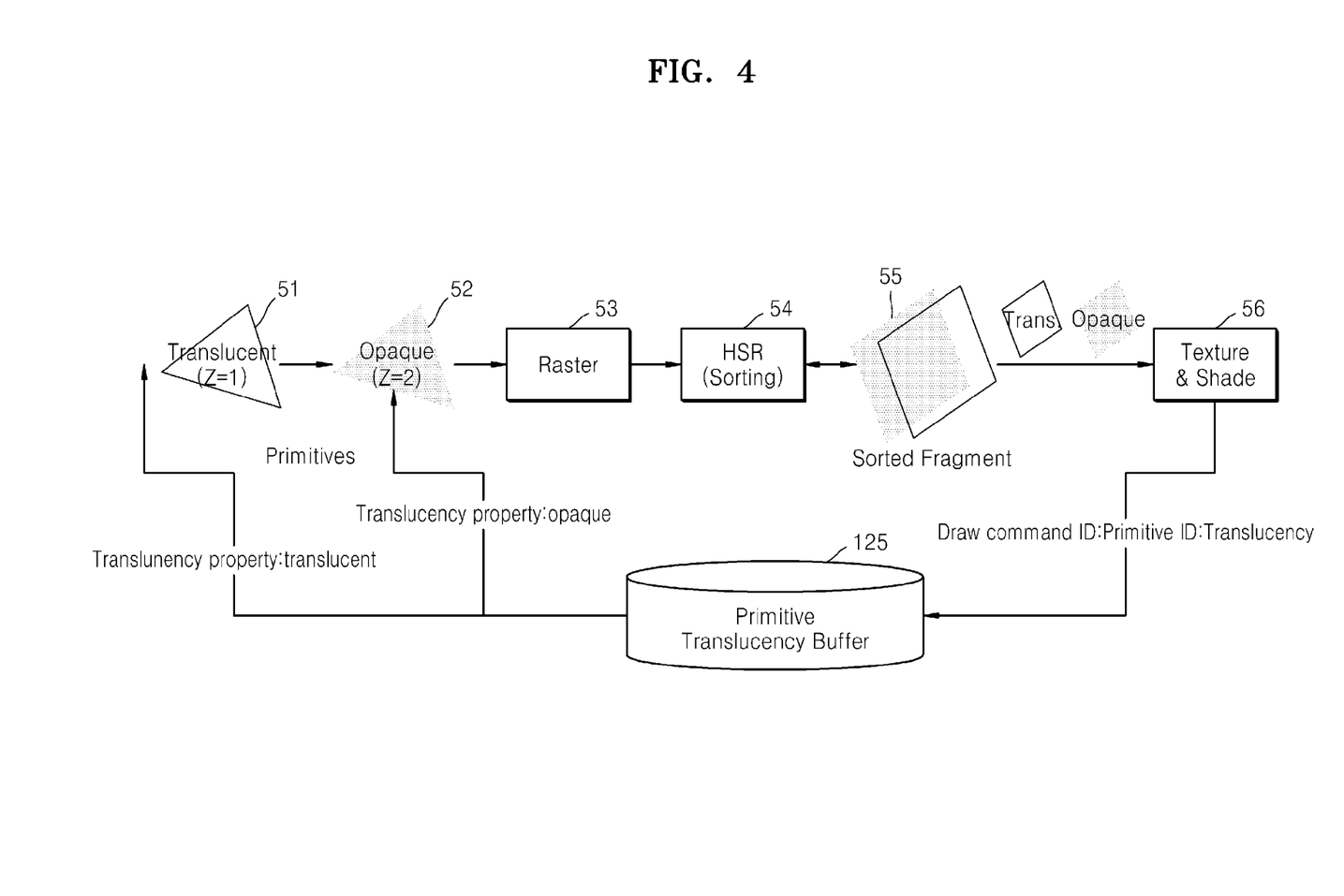
FIG. 4 is a diagram for explaining the image processing apparatus according to another embodiment of the present disclosure.

FIG. 4 is a diagram for explaining an image processing method according to an embodiment of the present disclosure, illustrating operations 51 through 56 when a primitive 51 that is transparent or translucent is located in front of a primitive 52 that is opaque.

Transparencies of the primitive 51 and the primitive 52 are stored in a primitive transparency buffer 125. Accordingly, information about whether each of the primitive 51 and the primitive 52 is transparent or opaque is read from the primitive transparency buffer 125.

Operation 53 is an operation of performing rasterization on the primitives 51 and 52. That is, in operation 53, each of the primitives 51 and 52 is divided into a plurality of fragments.

Operation 54 is an operation of sorting the fragments according to depths, and removing a hidden surface. The fragments are sorted according to depths, and fragments located at deeper positions than an opaque fragment are determined as including a hidden surface, and the hidden surface is removed.

Operation 55 is an operation of displaying the fragments that are sorted according to depths. FIG. 4 shows a case where a transparent fragment is located in front of an opaque fragment. The image processing method proceeds to the operation 56.

Operation 56 is an operation of shading and texturing each fragment. When the transparent fragment is located in front of the opaque fragment, both the transparent fragment and the opaque fragment are received. Accordingly, in operation 56, shading may first be performed on the opaque fragment. In operation 56, shading or texturing is first performed on the opaque fragment, and then shading or texturing is performed on the transparent fragment.

When operation 56 ends, a draw command ID, a primitive ID, and transparency information are stored in the primitive transparency buffer 125. The term "draw command ID" refers to a unique name for identifying each of the draw commands. The term "primitive ID" refers to a unique name for identifying each of the primitives. The term "transparency information" refers to information indicating a transparency of a primitive or an object.

Figure 5:
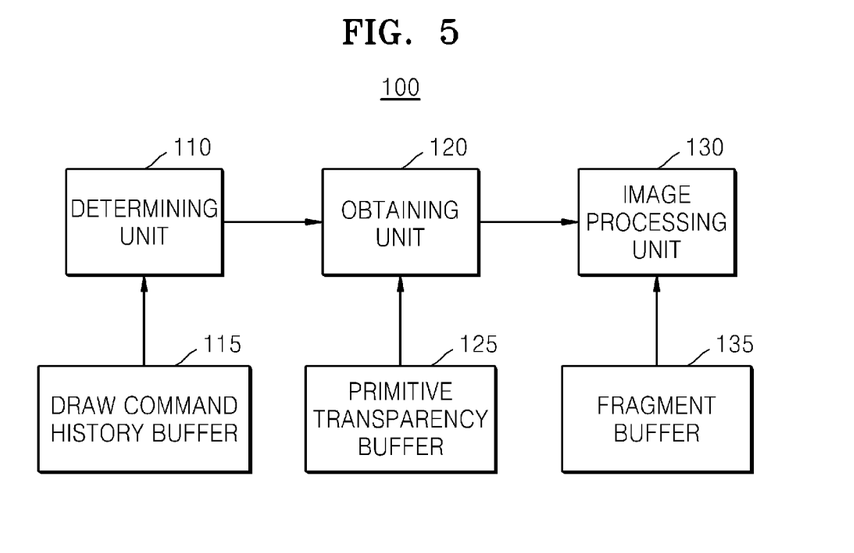
FIG. 5 is a block diagram for explaining the image processing apparatus according to another embodiment of the present disclosure.

FIG. 5 is a block diagram for explaining the image processing apparatus 100 according to another embodiment of the present disclosure. The image processing apparatus 100 of FIG. 5 is a modification of the image processing apparatus 100 of FIG. 3. Accordingly, although omitted, the description already made for the image processing apparatus 100 may apply to the image processing apparatus 100 of FIG. 5.

Referring to FIG. 5, the image processing apparatus 100 may further include, for example, a draw command history buffer 115, the primitive transparency buffer 125, and a fragment buffer 135.

The draw command history buffer 115 stores a current draw command that is input. The draw command history buffer 115 may be a part of a memory.

The determining unit 110 compares draw commands stored in the draw command history buffer 115 with the current draw command. The determining unit 110 accesses the draw command history buffer 115 in order to search for a previous draw command. The draw command history buffer 115 is updated whenever a draw command is input.

When the current draw command that is identical to a previous draw command is input, the determining unit 110 transmits related information to the obtaining unit 120. The term "frame" may refer to an image performed with a draw command. Accordingly, the determining unit 110 transmits related information indicating that an object or a primitive that is identical to an object or a primitive included in the current draw command is included in the previous frame to the obtaining unit 120. That is, the determining unit 110 transmits related information indicating that an object or a primitive that corresponds to an object or a primitive included in the current draw command is included in the previous frame to the obtaining unit 120

The primitive transparency buffer 125 stores information about transparencies of primitives. In other words, the primitive transparency buffer 125 stores information indicating whether primitives are transparent or opaque. The primitive transparency buffer 125 may be a part of a memory.

The obtaining unit 120 obtains the information about the transparencies of the primitives from the primitive transparency buffer 125. The obtaining unit 120 searches data stored in the primitive transparency buffer 125 for a primitive that is identical to a primitive to be currently processed. When a primitive that is identical to the primitive to be currently processed is stored in the primitive transparency buffer 125, the obtaining unit 120 determines whether the primitive is transparent or opaque by referring to the information about the transparencies stored in the primitive transparency buffer 125.

The obtaining unit 120 searches the primitive transparency buffer 125 based on the related information input from the determining unit 110. In other words, the obtaining unit 120 receives related information indicating an object or a primitive that has already been rendered, searches the primitive transparency buffer 125, and obtains information about a transparency of the object or the primitive that has already been rendered.

The obtaining unit 120 may output the information about the transparency of the object or the primitive to be processed to the image processing unit 130.

The fragment buffer 135 may store information about fragments according to depths. For example, when seen from an arbitrary viewpoint, the fragment buffer 135 stores information about which fragments exist as depths increase. The fragment buffer 135 may be a part of a memory.

The image processing unit 130 reads the information from the fragment buffer 135 and performs image processing. For example, the image processing unit 130 may remove a hidden surface by using the information read from the fragment buffer 135. Also, the image processing unit 130 may perform shading or texturing by using the information read from the fragment buffer 135.

The image processing unit 130 receives information about a transparency of a primitive on which image processing is to be performed from the obtaining unit 120. The image processing unit 130 performs image processing differently according to whether the primitive is transparent or opaque. For example, when the primitive is transparent, the image processing unit 130 determines whether an opaque primitive exists in a depth direction, and removes parts covered by the opaque primitive. When the primitive is opaque, the image processing unit 130 removes parts covered by the opaque primitive.

Figure 6:
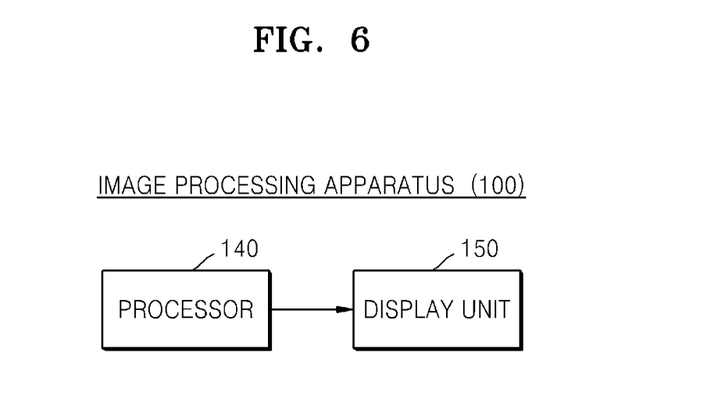
FIG. 6 is a block diagram for explaining the image processing apparatus according to another embodiment of the present disclosure.

FIG. 6 is a block diagram for explaining the image processing apparatus 100 according to another embodiment of the present disclosure. The image processing apparatus 100 of FIG. 6 is a modification of the image processing apparatus 100 of FIG. 3. Accordingly, although omitted, the description already made for the image processing apparatus 100 of FIG. 3 may apply to the image processing apparatus 100 of FIG. 6.

Referring to FIG. 6, the image processing apparatus 100 may include, for example, a processor 140 and a display unit 150. The processor 140 determines whether a current draw command that is identical to a previous draw command is input, obtains information about a transparency of a previous frame performed with the previous draw command, and performs image processing on the current frame based on the information about the transparency. For example, examples of the image processing performed by the processor 140 may include geometry processing and rendering.

The term "geometry processing" refers to a process of converting an object in a 3D coordinate system according to a viewpoint and projecting the object to a two-dimensional (2D) coordinate system.

The geometry processing includes a process of performing vertex shading, in other words, a process of determining vertices of objects in a 3D coordinate system and determining positions of the vertices.

The geometry processing includes a process of generating primitives. Each primitive is generated by connecting vertices. For example, the primitive may be a polygon such as a triangle or a quadrangle.

The term "rendering" refers to a process of determining a color of an image in a 2D system, storing the color in a frame buffer, and generating a 2D image to be displayed. Also, rendering may refer to a process of generating a 2D image that varies according to a viewpoint. Accordingly, during the rendering, a hidden surface is removed, and colors of pixels or fragments constituting the 2D image are determined.

The determining unit 110, the obtaining unit 120, and the image processing unit 130 of FIG. 5 may be parts of the processor 140.

The display unit 150 may display the 2D image received from the processor 140. The display unit 150 may be a liquid crystal display (LCD), a plasma display panel, or an organic electroluminescent panel.

Figure 7:
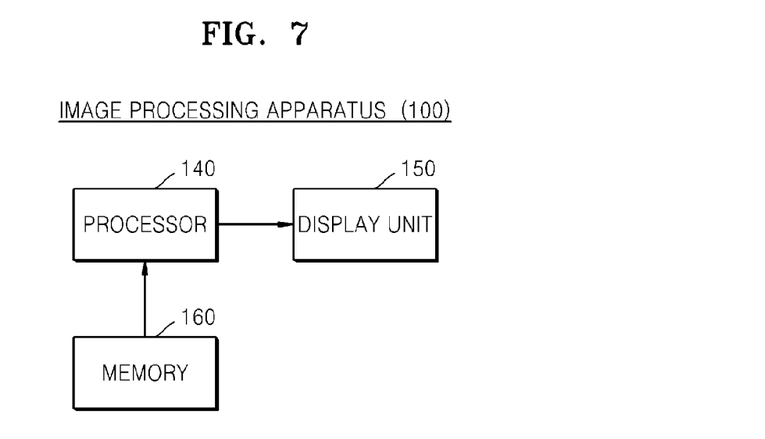
FIG. 7 is a block diagram for explaining the image processing apparatus according to another embodiment of the present disclosure.

FIG. 7 is a block diagram for explaining the image processing apparatus 100 according to another embodiment of the present disclosure. The image processing apparatus 100 of FIG. 7 is a modification of the image processing apparatus 100 of FIG. 6. Accordingly, although omitted in the following description, the description already provided for the image processing apparatus 100 of FIG. 6 may apply to the image processing apparatus 100 of FIG. 7.

The image processing apparatus 100 of FIG. 7 further includes a memory 160. The memory 160 stores information or data used during image processing.

Whenever a draw command is input, the memory 160 may store the draw command.

The memory 160 may store information about an object or a primitive. For example, the memory 160 may store an object ID, a primitive ID, and a primitive list. Also, the memory 160 may store information about a transparency of the object or the primitive. In this case, the memory 160 stores the information about the transparency along with an ID of the object or the primitive.

The draw command history buffer 115, the primitive transparency buffer 125, and the fragment buffer 135 of FIG. 5 may be included in the memory 160, and may be parts of the memory 160.

Figure 8:
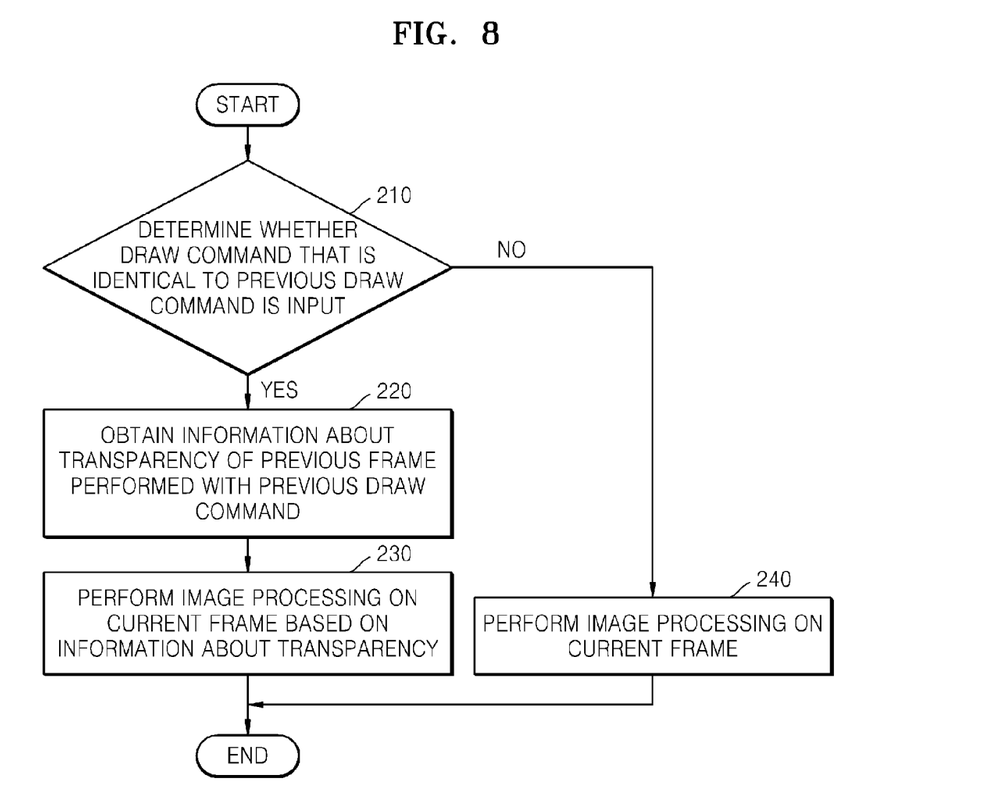
FIG. 8 is a view for explaining an image processing method according to an embodiment of the present disclosure.

FIG. 8 illustrates an image processing method according to another embodiment of the present disclosure, and may illustrate, for example, operations performed by the image processing apparatus 100 of FIG. 3. Accordingly, although omitted in the following description, the description already made for the image processing apparatus 100 of FIG. 3 may apply to the image processing method of FIG. 8.

In operation 210, the image processing apparatus 100 determines whether a draw command that is identical to a previous draw command is input. If the draw command that is identical to the previous draw command is input, the image processing method proceeds to operation 220, and otherwise, proceeds to operation 240.

When a draw command that is identical to the previous draw command has been input, the image processing apparatus 100 determines which an object or primitive from among a plurality of objects or primitives included in the draw command is identical.

In operation 220, the image processing apparatus 100 obtains information about a transparency of a previous frame that is performed with the previous draw command. The term "information about a transparency of a previous frame" refers to information indicating a transparency of an object or a primitive included in a previous frame. The image processing apparatus 100 obtains information indicating which object or primitive is transparent.

In operation 230, the image processing apparatus 100 performs image processing on a current frame based on the information about the transparency. For example, before shading is performed based on the information about the transparency, the image processing apparatus 100 determines which object is transparent. When an object is a transparent object, the image processing apparatus 100 first performs shading on an opaque object that is located behind or further away in a depth direction than the transparent object. In other words, the image processing apparatus 100 performs shading in a direction opposite the depth direction, that is, starting from an object located farther from a viewpoint and continuing toward an object located closer to the viewpoint.

In operation 240, the image processing apparatus 100 performs image processing on the current frame. That is, since the draw command that is identical to the previous draw command is not input, and thus the image processing apparatus 100 cannot determine whether an object or a primitive included in the current frame is transparent, the image processing apparatus 100 sequentially performs shading in the depth direction. In an embodiment, the term depth direction refers to a direction starting from an object located nearer to a viewpoint and continuing toward an object located farther from the viewpoint.

Operations 210 through 240 of FIG. 8 may be performed by the image processing apparatus 100 of FIG. 3 or the processor 140 of FIGS. 6 and 7.

Figure 9:
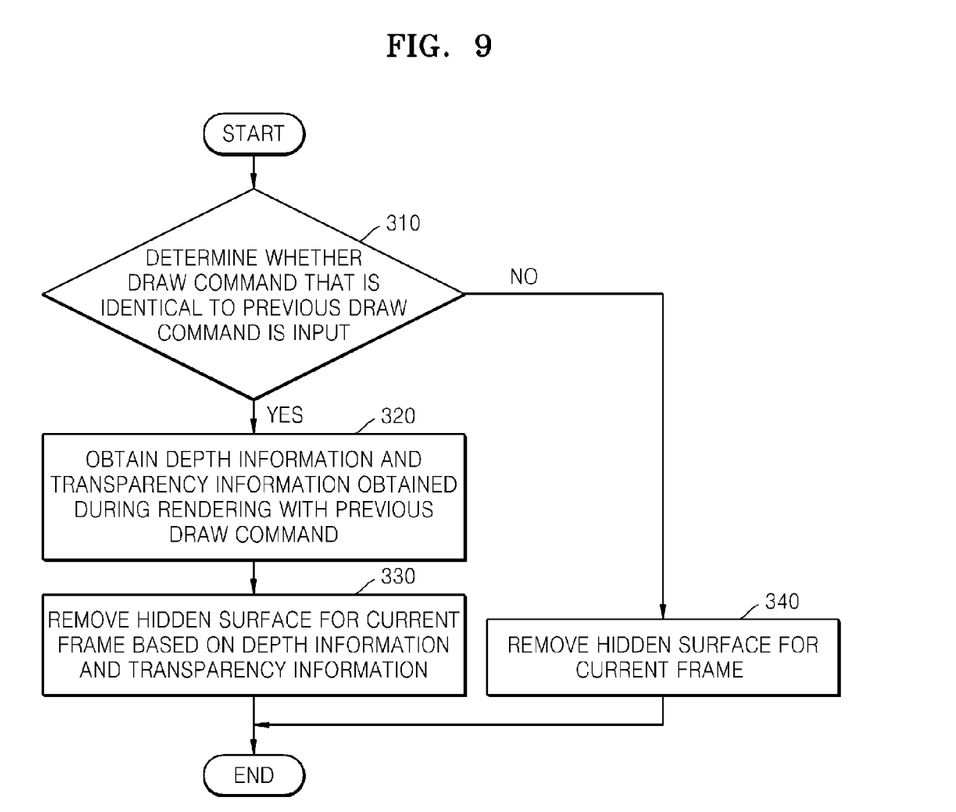
FIG. 9 is a flowchart for explaining an image processing method according to another embodiment of the present disclosure.

FIG. 9 is a flowchart for explaining an image processing method according to another embodiment of the present disclosure, illustrating operations performed by the image processing apparatus 100 of FIG. 3. Accordingly, although omitted, the description already made for the image processing apparatus 100 may apply to the image processing method of FIG. 9.

In operation 310, the image processing apparatus 100 determines whether a previous draw command and a current draw command are identical to each other. If the previous draw command and the current draw command are identical to each other, the image processing method proceeds to operation 340, and otherwise, proceeds to operation 320.

In operation 320, the image processing apparatus 100 obtains depth information and transparency information obtained during rendering with the previous draw command. The depth information obtained during the rendering is information indicating a depth of an object or a primitive. Also, the transparency information obtained during the rendering is information about whether the object or the primitive is transparent.

The image processing apparatus 100 may determine relative positions of objects during rendering. Accordingly, the image processing apparatus 100 may determine which object is located at a foremost position, e.g., at a position closer to the viewpoint, and whether a part of a first object is covered by a second object that is located in front of the first object. Information indicating the relative positions of the objects is stored in a memory. The image processing apparatus 100 may perform the above process in units of primitives instead of in units of objects.

In operation 330, the image processing apparatus 100 removes a hidden surface for a current frame based on the depth information and the transparency information. The image processing apparatus 100 removes a hidden surface of an object that is located behind, according to the obtained relative positions of the objects. Also, when there exists a transparent object, since an object that is located behind the transparent object is not a hidden surface, the image processing apparatus 100 does not remove the object located behind the transparent object. Accordingly, when the object that is located behind the transparent object is an opaque object, the image processing apparatus 100 removes a hidden surface of an object that is located behind the opaque object. Since the image processing apparatus 100 already knows which object is transparent, the image processing apparatus 100 may omit a process of performing shading in a depth direction and may instead perform shading in a reverse direction.

The image processing apparatus 100 may perform the above process in units of primitives instead of in units of objects.

In operation 340, the image processing apparatus 100 may remove a hidden surface for a current frame. Since a current draw command that is identical to the previous draw command has not been input, and thus the image processing apparatus 100 may not know whether an object included in the current frame is transparent, the image processing apparatus 100 sequentially performs shading in the depth direction. The image processing apparatus 100 checks a transparent object based on a result of the shading. The image processing apparatus 100 performs shading in the reverse direction to the depth direction on the checked transparent object. When the image processing apparatus 100 cannot determine in advance whether an object is transparent, the image processing apparatus 100 performs shading forward, and then performs shading in the reverse direction. Accordingly, the computational amount for performing shading forward is additionally generated.

Operations 310 through 340 of FIG. 9 may be performed by the image processing apparatus 100 of FIG. 3 or the processor 140 of FIGS. 6 and 7.

Figure 10:
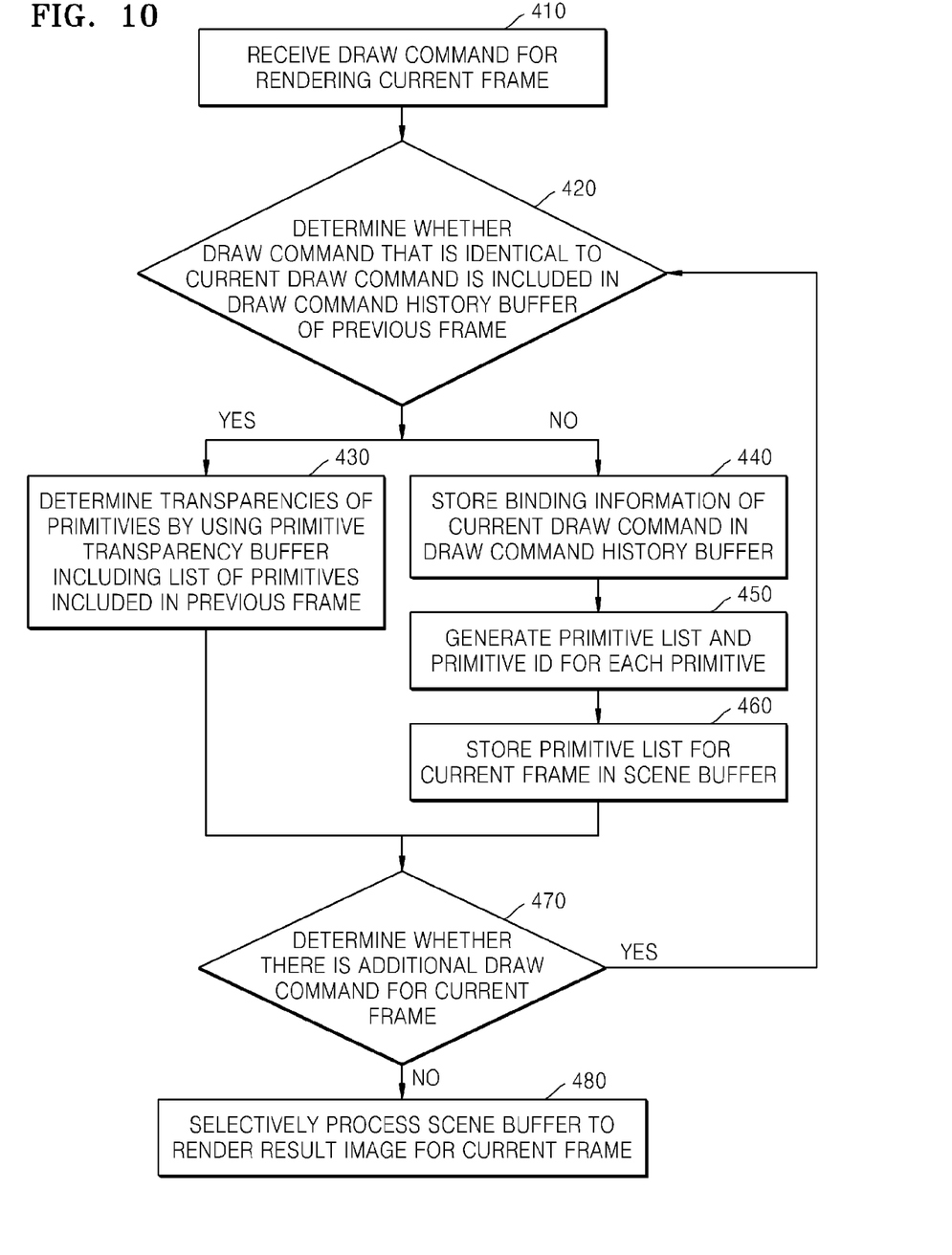
FIG. 10 is a flowchart for explaining an image processing method according to whether draw commands are identical to each other, according to another embodiment of the present disclosure.

FIG. 10 illustrates an image processing method according to whether draw commands are identical to each other, according to another embodiment of the present disclosure. The image processing apparatus 100 processes an input draw command according to whether draw commands are identical to each other.

In operation 410, the image processing apparatus 100 receives a current draw command for rendering a current frame. For example, the current draw command includes information about which object is to be rendered in which direction.

In operation 420, the image processing apparatus 100 checks whether a draw command that is identical to the current draw command is included in a draw command history buffer. The draw command history buffer stores draw commands for previous frames. Accordingly, the image processing apparatus 100 may compare the draw commands stored in the draw command history buffer with the current draw command. If a draw command that is identical to the current draw command is included, the image processing method proceeds to operation 430, and otherwise, proceeds to operation 440.

In operation 430, the image processing apparatus 100 determines transparencies of primitives by using a primitive transparency buffer that stores a list of primitives included in the previous frames. The primitives included in the previous frames are primitives to be rendered for the previous frames. The primitive transparency buffer stores information about transparencies of the primitives included in the previous frames. Accordingly, the image processing apparatus 100 may determine a transparency of a current primitive that corresponds to a primitive included in the previous frame or frames by using the primitive transparency buffer.

In operation 440, the image processing apparatus 100 stores binding information of the current draw command in the draw command history buffer. The draw command history buffer may sequentially store input draw commands.

In operation 450, the image processing apparatus 100 generates a primitive list and a primitive ID for each primitive. The primitive list is information indicating primitives included in one tile. The term "tile" refers to a unit obtained by dividing a frame. One tile may include a plurality of primitives. The term "primitive ID" refers to a unique name for identifying each primitive.

In operation 460, the image processing apparatus 100 stores a primitive list for the current frame in a scene buffer. The scene buffer is a memory that stores a primitive list. The image processing apparatus 100 stores a primitive list indicating which primitives are included in each tile in the scene buffer.

In operation 470, the image processing apparatus 100 determines whether there is an additional draw command for the current frame. If there is an additional draw command, the image processing method proceeds to operation 420, and otherwise, proceeds to operation 480.

In operation 480, the image processing apparatus 100 selectively processes the scene buffer in order to render a result image for the current frame. When the image processing apparatus 100 processes the scene buffer, it means that the image processing apparatus 100 performs image processing on primitives stored in the scene buffer.

Operations 410 through 480 of FIG. 10 may be performed by the image processing apparatus 100 of FIG. 3 or the processor 140 of FIGS. 6 and 7. Also, operations 410 through 480 of FIG. 10 may be performed in units of objects instead of units of primitives.

Figure 11:
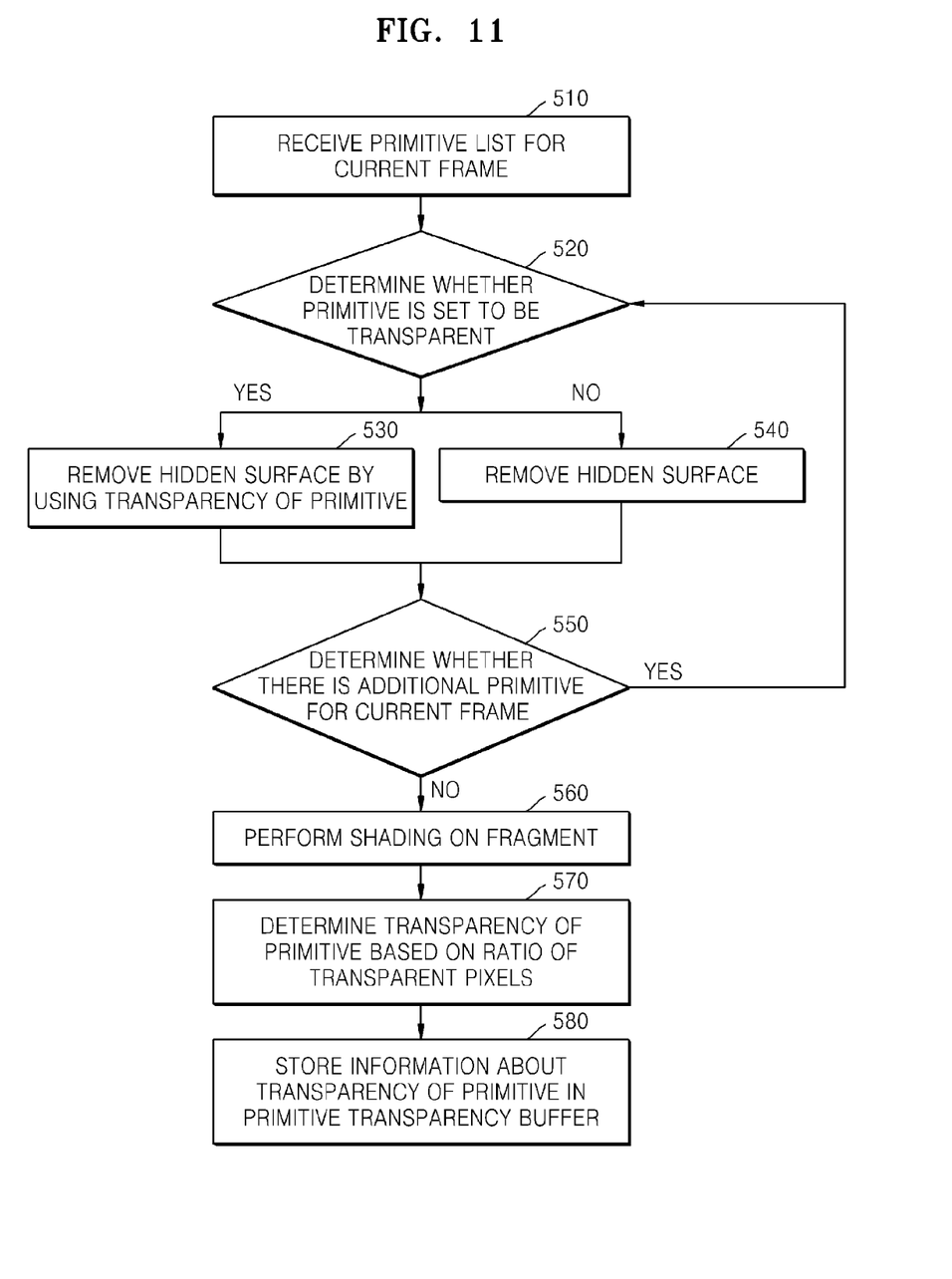
FIG. 11 is a flowchart for explaining an image processing method according to a transparency of a primitive, according to another embodiment of the present disclosure.

FIG. 11 illustrates an image processing method according to a transparency of a primitive, according to another embodiment of the present disclosure. The image processing apparatus 100 uses a method of removing a hidden surface differently according to whether a primitive is transparent or opaque.

In operation 510, the image processing apparatus 100 receives a primitive list for a current frame. The primitive list may be generated for every tile. Accordingly, the image processing apparatus 100 may divide the current frame into a plurality of tiles, and may receive a primitive list indicating primitives included in each of the tiles.

In operation 520, the image processing apparatus 100 determines whether a primitive is set to be transparent. If the primitive is set to be transparent, the image processing method proceeds to operation 530, and otherwise, proceeds to operation 540.

In operation 530, the image processing apparatus 100 removes a hidden surface by using a transparency of the primitive. An opaque primitive that is located behind a transparent primitive is not a hidden surface. Accordingly, the image processing apparatus 100 removes a hidden surface of an object located behind the opaque primitive and obscured by the opaque primitive.

In operation 540, the image processing apparatus 100 removes a hidden surface. Since the primitive is not transparent, the image processing apparatus 100 removes a hidden surface covered by the primitive.

In operation 550, the image processing apparatus 100 determines whether there is an additional primitive for the current frame. If there is an additional primitive, the image processing method proceeds to operation 550, and otherwise, proceeds to operation 560.

In operation 560, the image processing apparatus 100 performs fragment shading. The image processing apparatus 100 performs shading on the primitive that has not been removed as a hidden surface in units of fragments.

In operation 570, the image processing apparatus 100 determines a transparency of the primitive based on a ratio of transparent pixels. The primitive includes a plurality of pixels. From among the plurality of pixels included in the primitive, when a ratio of pixels that are determined to be transparent pixels as a result of the shading exceeds a threshold value, the image processing apparatus 100 determines the primitive including the transparent pixels as a transparent primitive. For example, when one primitive includes 100 pixels and 90 pixels from among the 100 pixels are transparent pixels, the image processing apparatus 100 determines that the primitive is transparent.

In operation 580, the image processing apparatus 100 stores information about the transparency of the primitive in a primitive transparency buffer. The image processing apparatus 100 stores information about the primitive that is determined to be transparent in operation 570 in the primitive transparency buffer. The information stored in the primitive transparency buffer may be used when rendering is performed on the same primitive.

Operations 510 through 580 of FIG. 11 may be performed by the image processing apparatus 100 of FIG. 3 or the processor 140 of FIGS. 6 and 7.

According to the one or more of the above embodiments of the present disclosure, since information about a transparency of an object or a primitive obtained from a previous frame is applied to an object or a primitive of a current frame, the computational amount needed for image processing may be reduced.

Since an image for the current frame is processed by using the fact that an attribute of an inter-frame coherent object is not changed, image processing may be efficiently performed on the same object.

Whether an inter-frame coherent object is included may be determined by determining whether draw commands are identical to each other.

The present disclosure may be embodied as a program executed in a computer, and may be implemented in a general purpose digital computer by using a computer-readable medium. Also, a structure of data used in the method may be recorded by using various units on a computer-readable medium.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the image processing apparatus and method described herein.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image processing method comprising:
   determining whether a draw command that is identical to a previous draw command is input;
   obtaining information about a transparency of a previous frame that is performed with the previous draw command by setting a primitive or an object to be transparent, in response to a transparency ratio of pixels constituting the primitive or the object being higher than a preset ratio, wherein the transparency ratio is a ratio of pixels in an interior of the primitive or the object that are determined to be transparent pixels to a total number of pixels in the interior; and
   performing image processing on a current frame based on the information about the transparency of the previous frame, wherein the draw command indicates whether rendering is to be performed on the object or the primitive.

2. The image processing method of claim 1, wherein the determining comprises determining whether the previous draw command and the input draw command are identical to each other by comparing all, essential parts, or summary information of the previous draw command with all, essential parts, or summary information of the input draw command.

3. The image processing method of claim 1, wherein the determining further comprises determining whether the previous draw command and the input draw command comprise at least one identical primitive.

4. The image processing method of claim 1, wherein the determining further comprises determining whether the previous draw command and the input draw command comprise at least one similar object.

5. The image processing method of claim 1, wherein the obtaining further comprises obtaining a transparency of a primitive or an object included in the previous frame.

6. The image processing method of claim 1, wherein the performing of the image processing further comprises setting a primitive or object in the current frame to be transparent when a corresponding primitive or object included in the previous frame is transparent.

7. The image processing method of claim 1, wherein the performing of the image processing further comprises, in response to a transparent fragment being located in front of an opaque fragment according to the information about the transparency, first performing shading on the opaque fragment and performing shading on the transparent fragment.

8. A non-transitory computer-readable recording medium having embodied thereon a program for executing the method of claim 1.

9. An image processing method comprising:
determining whether a previous draw command and a current draw command are identical to each other;
in response to the previous draw command and the current draw command being identical to each other, obtaining depth information and transparency information obtained during rendering with the previous draw command; and
removing a hidden surface of a current frame based on the obtained depth information and transparency information, wherein the current draw command indicates whether rendering is to be performed on an object or a primitive, wherein the obtaining further comprises, in response to a transparency ratio of pixels constituting the primitive or the object being higher than a preset ratio, setting the primitive or the object to be transparent, wherein the transparency ratio is a ratio of pixels in an interior of the primitive or the object that are determined to be transparent pixels to a total number of pixels in the interior.

10. The image processing method of claim 9, wherein the obtaining further comprises obtaining information about a transparency of a fragment according to a depth during the rendering.

11. The image processing method of claim 9, wherein the removing of the hidden surface further comprises applying the depth information and the transparency information to a fragment of the current frame, and in response to a transparent fragment being located in front of an opaque fragment, first performing shading on the opaque fragment and then performing shading on the transparent fragment.

12. An image processing apparatus comprising:
a memory configured to store instructions; and
one or more processors configured to execute the instructions to:
determine whether a draw command that is identical to a previous draw command is input;
obtain information about a transparency of a previous frame performed with the previous draw command by setting a primitive or an object to be transparent, in response to a transparency ratio of pixels constituting the primitive or the object being higher than a preset ratio, wherein the transparency ratio is a ratio of pixels in an interior of the primitive or the object that are determined to be transparent pixels to a total number of pixels in the interior; and
perform image processing on a current frame based on the information about the transparency of the previous frame, wherein the draw command indicates whether rendering is to be performed on the object or the primitive.

13. The image processing apparatus of claim 12, wherein the one or more processors determines whether the previous draw command and the input draw command are identical to each other by comparing all, essential parts, or summary information of the previous draw command with all, essential parts, or summary information of the input draw command.

14. The image processing apparatus of claim 12, wherein the one or more processors determines whether the previous draw command and the input draw command comprise at least one same primitive.

15. The image processing apparatus of claim 12, wherein the one or more processors determines whether the previous draw command and the input draw command comprise at least one same object.

16. The image processing apparatus of claim 12, wherein the one or more processors obtains information about whether a primitive or an object included in the previous frame is transparent.

17. The image processing apparatus of claim 12, wherein the one or more processors sets a primitive or object included in the current frame to be transparent when a corresponding primitive or object included in the previous frame is transparent, and performs image processing.

18. The image processing apparatus of claim 12, wherein in response to a transparent fragment is located in front of an opaque fragment according to the information about the transparency, the one or more processors first performs shading on the opaque fragment and then performing shading on the transparent fragment.

19. The image processing apparatus of claim 12, wherein in response to the one or more processors determining that there is an additional primitive for the current frame, the one or more processors determines whether the additional primitive is set to be transparent, and in response to determining that there are no additional primitives for the current frame, the one or more processors performs shading on a primitive that has not been removed as a hidden surface.

* * * * *